H. P. TOTHAMMER & G. OSBORNE.
Mechanisms for Loading and Unloading Lumber.
No. 151,253. Patented May 26, 1874.
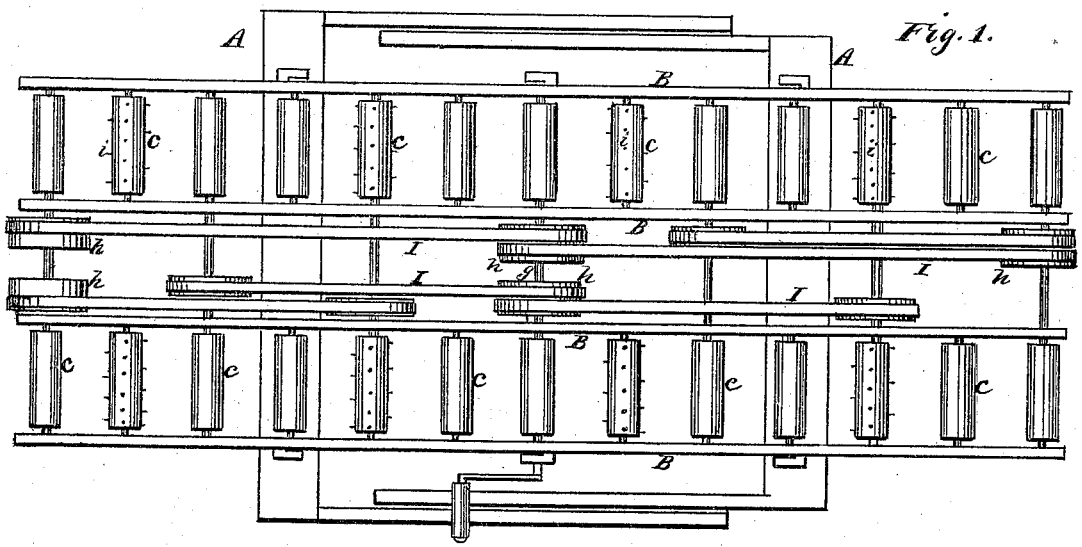
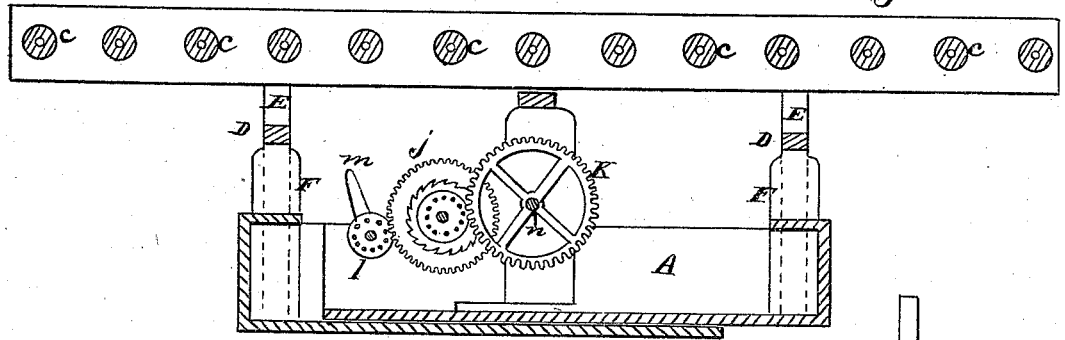
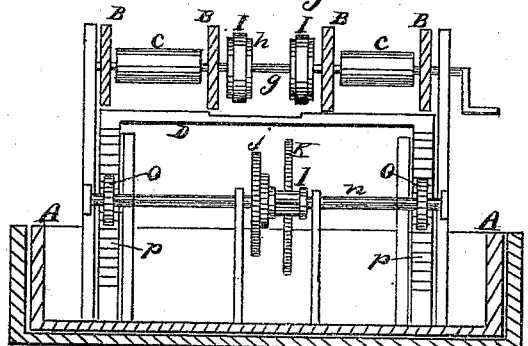
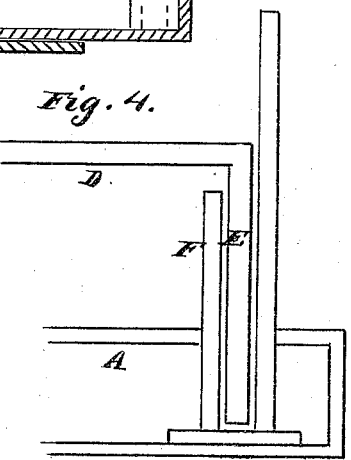
Witnesses
John L. Borne
E. M. Richardson
Inventors
Hans P. Tothammer
Gustav Osborne
by Dewey
Attys

UNITED STATES PATENT OFFICE.

HANS P. TOTHAMMER AND GUSTAV OSBORNE, OF SAN FRANCISCO, CAL.

IMPROVEMENT IN MECHANISMS FOR LOADING AND UNLOADING LUMBER.

Specification forming part of Letters Patent No. 151,253, dated May 26, 1874; application filed April 21, 1874.

*To all whom it may concern:*

Be it known that we, HANS P. TOTHAMMER and GUSTAV OSBORNE, of San Francisco city and county, State of California, have invented a Machine for Moving and Transporting Lumber; and we do hereby declare the following description and accompanying drawings are sufficient to enable any person skilled in the art or science to which it most nearly appertains to make and use our said invention or improvement, without further invention or experiment.

Our invention relates to a machine for moving or transporting wood and lumber from one place to another, but which is especially adapted for unloading lumber from ships and lighters, and delivering it upon the wharf or land. Our machine consists of one or more tracks or ways, each of which is formed of a series of parallel corrugated or toothed rollers, which are driven by belt or equivalent connections with one or more steam-engines, so that the lumber, wood, or other article or thing, which is placed upon the rollers at one end of the way or track, will be carried along by the rollers to the opposite end.

Referring to the accompanying drawings, Figure 1 is a plan view of our machine. Fig. 2 is a sectional elevation. Fig. 3 is an end view. Fig. 4 is a detail of a part of the machine.

Let A A represent one or more lighters, flat-boats, or land-frames, upon which we construct our lumber-moving tracks. Each track consists of two upright side boards, B B, placed at the desired distance apart, in which the journals of the rollers $c\ c\ c$ bear, so that the side boards extend above the top of the roller, and thus form a trough or way. Two or more of these tracks may be placed side by side, or one single wide track may be used. We prefer a double track, as it is more conveniently operated, and the lumber will not clog or interfere when moving in single lines on separate tracks. This track or combination of tracks we place upon adjustable trestles or frames, consisting of the horizontal timber D with its legs E E. These legs E E enter hollow standards F at the opposite sides of the lighter or frame A, so that the timber D extends horizontally across the width of the boat, lighter, or frame, and upon these timbers the tracks are placed. The legs E can move up and down in the hollow standards, and, in some instances, we will arrange a rack and pinion to raise the trestles, as hereinafter described. When a double track is used, a single shaft, $g$, which extends across both tracks so as to carry a roller at each end, is used, so that by placing a pulley, $h$, upon the shaft between the two tracks, both rollers will be driven. Belts I I are arranged to connect the pulleys on the various shafts, and they may be applied between the tracks or outside of them, as desired. We have represented them in the present instance as being placed between the tracks. One or more of the rollers we provide with teeth, ribs, or projections $i\ i\ i$, so that the lumber, wood, or other article will be moved along by the revolution of the rollers. Upon each lighter or flat-boat we place a lifting-trestle, similar to the trestles D E, with which a suitable lifting mechanism is connected, so that the track can be raised and lowered as the tide raises and lowers the lighter. In the present instance we have represented the toothed wheels $j\ k$ and pinion $l$ operated by a crank, $m$, so as to rotate a transverse shaft, $n$. This shaft carries at each end a pinion, $o$, which engages with a rack, $p$, on the legs E of the trestle, so that by turning the crank $m$ the tracks are raised or lowered. As many lighters, provided with tracks of the above description, can be used as will be required to convey the lumber from the ship or loaded lighter to the wharf or other place where it is to be deposited. These lighters will be placed in line and the tracks connected, so as to provide a continuous track or tracks from point to point. Now, by applying power, steam or otherwise, to the pulleys $h$, the rollers will be rotated throughout the length of the tracks, so that when pieces of lumber, wood, and large articles are placed upon the track at one end they will be carried to the opposite end and deposited.

By this arrangement we are able to unload cargoes of lumber, wood, and like large articles, from ships and lighters with very little trouble and handling, thus greatly reducing the cost of removing the cargo. The device can also be used for conveying lumber and wood from from place to place on land with equal facility. The rollers being provided with spurs or teeth the lumber can be carried up a considerable incline without slipping.

We are aware that heretofore a series of toothed rollers have been arranged parallel to transport commodities. This I do not claim, broadly; but

Having thus described our invention, what we claim, and desire to secure by Letters Patent, is—

1. The track, consisting of the side boards B B, with their horizontal series of parallel toothed or spurred rollers c c c and pulleys h, said rollers being connected and operated substantially as above specified.

2. In combination, with a lumber-transporting track, B B c c c, the trestles, consisting of the horizontal timber D, with their legs E, to operate in the hollow standards F, substantially as and for the purpose above described.

In witness whereof we hereunto set our hands and seals.

HANS PETTER TOTHAMMER. [L. S.]
  GUSTAV OSBORNE. [L S.]

Witnesses:
 JOHN L. BOONE,
 C. M. RICHARDSON.